June 18, 1935.  R. PRAÜTZSCH  2,005,504
PUMP FOR AUTOMATIC PERIODICALLY WORKING GAS ANALYZERS
Filed Oct. 23, 1934
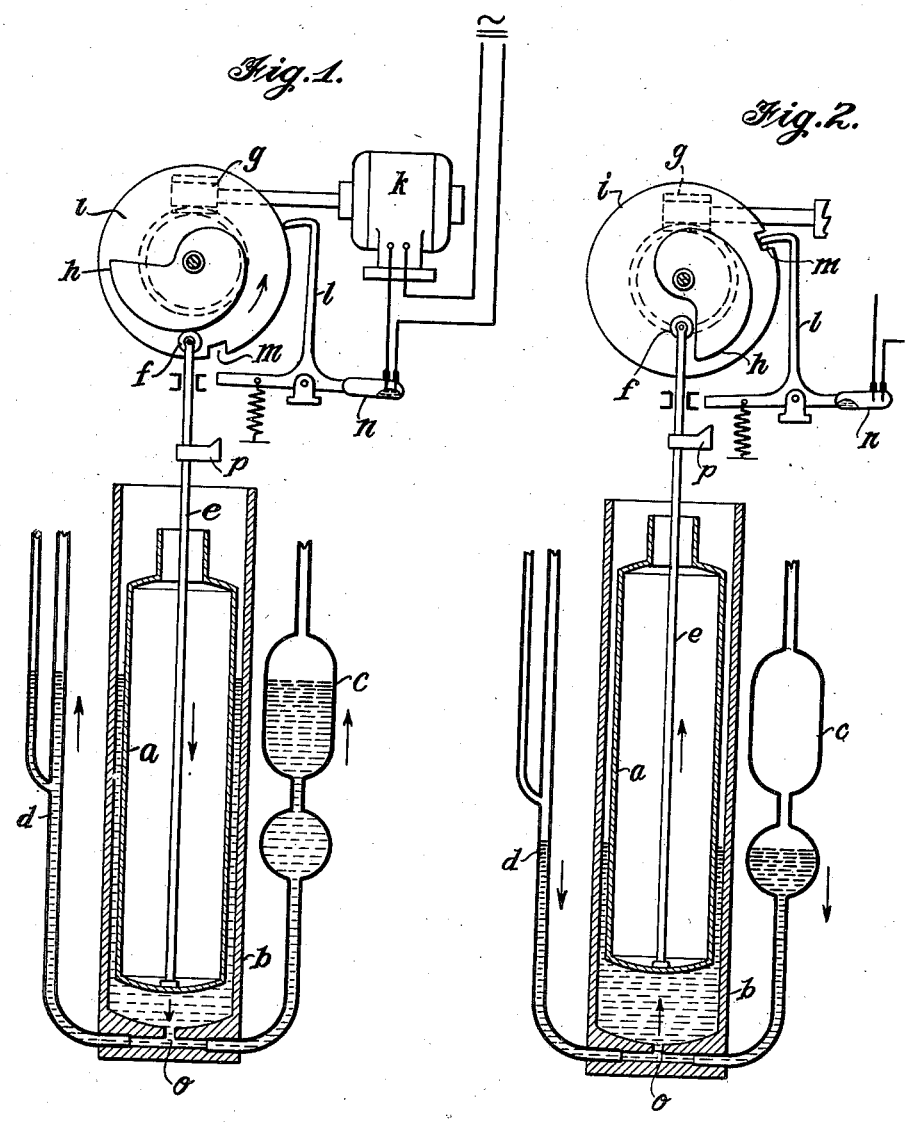
Inventor
Richard Praützsch
By Knight Bros
His Attorneys Patented June 18, 1935

2,005,504

UNITED STATES PATENT OFFICE 2,005,504

PUMP FOR AUTOMATIC, PERIODICALLY WORKING GAS ANALYZERS

Richard Praützsch, Hamburg, Germany

Application October 23, 1934, Serial No. 749,640
In Germany February 10, 1934

4 Claims. (Cl. 230—85)

To set an automatic, periodically working gas analyzer in operation a power is necessary which will move the sealing medium upwards and downwards in a so-called hydraulic gas pump. There are several electrically driven gas analyzers known which use different sorts of arrangement to set them to work, for example, apparatuses which raise the sealing medium automatically upwards and downwards by means of a lifting bottle and also those using a piston or plunger for this purpose. Such an arrangement using a plunger works as follows:

A plunger is pressed into a cylinder filled with sealing medium by means of motive power and a cam. Due to the communication of the cylinder with the hydraulic gas pump the sealing medium is forced into the measuring cylinder of the gas pump. By the downward movement of the piston the sealing medium rises in the gas pump. The rising piston causes the sealing medium to return into the cylinder. When using this principle for automatic gas analyzers there is one difficulty. It may happen that the movement of the sealing medium and the movement of the piston do not work together because the sealing medium cannot follow the movement of the piston. If for example the filtering device or the tubes between the gas analyzer and the sampling point begin to plug or are plugged the aspiration of the gas into the measuring device cannot follow the movement of the piston. In this way the movement of the sealing medium level will be slower than the movement of the plunger. If the gas lines or the filtering device are wholly plugged, the sealing medium is suspended in the gas pump. Independent of this, the piston still moves upwards and downwards, and in this way the indications of the recorder are falsified.

At first this fault is comparatively small but in time it grows and will only be observed when it is grown so large that doubt arises with regard to the accuracy of the recorder. Therefore, the period of time for raising the piston must be increased so that a difference in the movement of the sealing medium only arises if the resistance of the sampling tube or filtering device is very large. This would mean a very slow speed of the machine and only a few analyses per hour, but the machine is still liable to be disturbed in the above described manner and to fall out of step.

In the following, an example of the invention is described in which the above fault cannot happen. The main idea of the invention is to use a piston pump in such a way that the plunger is moved downwards by motive power; but the piston is pressed upwards by the refalling sealing medium alone. During this time, the motor is put out of work. The characteristic features of the invention are set forth in the accompanying drawing.

Figs. 1 and 2 are sectional side elevations of the mechanism used for taking a fixed volume of the gas mixture to be analyzed and for moving and measuring the sample during the determination of the particular gas in question.

The plunger "$a$" is pressed into the cylinder "$b$" filled with mercury. At the bottom of the cylinder the measuring device "$c$" and the seal "$d$" of the hydraulic pump are connected. The analyzing apparatus, which is not shown in the drawing, may be of any suitable type, for example that shown in the patent to Olof Rodhe, No. 1,351,129 dated August 31, 1920, wherein the measuring vessel $k$ corresponds to the measuring vessel $c$ in the drawing of this application and the seal tube $c$ of the patent corresponds to the seal tube $d$. The cylinder is pressed downwards by the shaft "$e$", equipped on its upper end with the roll "$f$". By means of the motor "$k$", the cam "$h$" and also the disk "$i$" are turned by the screw "$g$". The moving cam presses the shaft "$e$" downwards and the piston "$a$" is pressed into the mercury. (This position is shown in Fig. 1). The mercury rises in cylinder "$b$" and also in the measuring device "$c$" and in the seal tube "$d$". As soon as the roll "$f$" of the shaft "$e$" passes the largest radius of the cam the downwardly moving plunger "$a$" has reached its lowest position. At the same time the mercury is pressed into the measuring device up to the small tube above the upper bulb, and the nose of the pawl "$l$" enters the notch "$m$" of the turning disk "$i$". By this movement, the mercury switch "$n$" is also moved and the current for the motor "$k$" is interrupted. At this moment, the roll "$f$" has already passed the largest radius of the cam "$h$". The mercury in the cylinder "$b$" in the measuring device "$c$" and in the stop tube "$d$" is forced downwards by its own weight and is collected at the bottom of the cylinder. At the entrance of the cylinder a constriction "$o$" is arranged so that the mercury can fall, slowly moving the piston at the same rate of speed upwards. Fig. 2 shows the pump device at the moment when the mercury presses the plunger "$a$" upwards. Shortly before the plunger reaches its highest position the nose "$p$" fixed on the shaft "$e$" lifts the pawl "$l$" out of the notch "$m$"

of the disk "i" moving in this way the mercury switch "n" by which the motor "k" is put to work again. Now the motor turns the cam "h" and by these means the plunger is pressed downwards.

When the plunger is moving downward, there is an acceleration in the velocity of the mercury rising in the gas pump "c" when it passes the connection between the lower and the upper bulb. During this time the stop tube "d" is closed and the amount of the gas to be analyzed is expelled from the upper bulb. But to get an exact measurement the speed should be reduced and therefore the cam can be made in such a way that the speed of the rising mercury can be reduced wherever necessary.

Having described my invention, what I claim is:

1. In a pump for gas analyzers, a cylinder containing a sealing medium, a gas pump connected to the lower end thereof and adapted to receive sealing medium from said cylinder, a plunger mounted to move up and down in said cylinder to change the level of sealing medium in said gas pump, driving means adapted to force said plunger downward, said driving means being adapted to release said plunger to return to its upper position by its own buoyancy as the sealing medium returns from said gas pump to said cylinder.

2. In a pump for gas analyzers, a cylinder containing a sealing medium, a gas pump connected to the lower end thereof and adapted to receive sealing medium from said cylinder, a plunger mounted to move up and down in said cylinder to change the level of sealing medium in said gas pump, motor driven means adapted to force said plunger downward, said means being adapted to release said plunger to return to its upper position by its own buoyancy as the sealing medium returns from said gas pump to said cylinder, means to cut off said motor when said plunger has been released, and means operable upon return of said plunger to its highest position for starting said motor again.

3. A pump for gas analyzers as described in claim 1, wherein said driving means comprises a cam designed to modify the speed of rise of the sealing medium in said gas pump to insure an accurate measurement of the gas sample.

4. A pump for gas analyzers as described in claim 1, wherein said connection between said cylinder and said gas pump is provided with a constriction.

RICHARD PRAÜTZSCH.